G. W. Bishop.
Friction Clutch Pulley.
N° 58,765                  Patented Oct. 16, 1866.
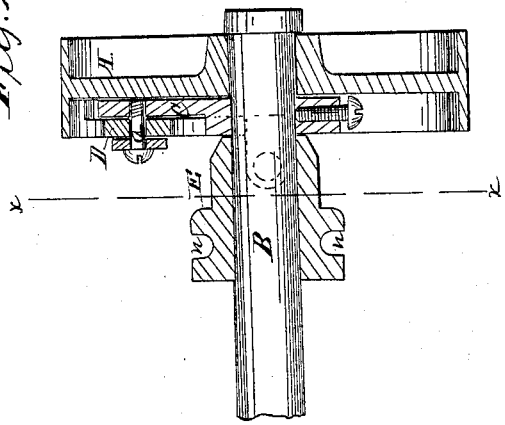
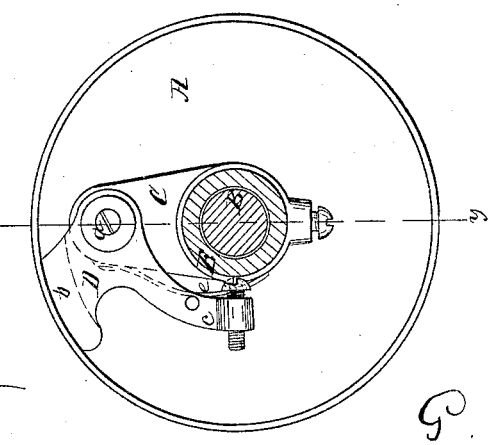
Witnesses:
Inventor
G. W. Bishop

UNITED STATES PATENT OFFICE.

GEORGE W. BISHOP, OF STAMFORD, CONNECTICUT.

IMPROVEMENT IN FRICTION-CLUTCH PULLEYS.

Specification forming part of Letters Patent No. 58,765, dated October 16, 1866.

*To all whom it may concern:*

Be it known that I, GEORGE W. BISHOP, of Stamford, in the county of Fairfield and State of Connecticut, have invented a new and useful Improvement in Friction-Clutch Pulleys; and I do hereby declare that the following is a full, clear, and exact description of the same, reference being had to the accompanying drawings, making part of this specification.

Figure 1 represents a sectional side elevation of the invention, the line $x\,x$, Fig. 2, indicating the place of section. Fig. 2 is a transverse central section thereof, the place of section being indicated by the line $y\,y$, Fig. 1.

Similar letters denote corresponding parts in the two figures.

This invention consists in the combination, with an ordinary pulley, for the purpose of holding the pulley rigid upon the shaft, of a dog, which is hinged or pivoted to an arm extending from said shaft, and a sliding sleeve, whereby the dog may be pressed up against the inner circumference of the rim of the pulley by properly adjusting the sliding sleeve, and in this way the pulley may be clamped or released instantly, and without chucks or noise in operating the clutch mechanism.

A represents an ordinary pulley, fitted to revolve loosely on its shaft B. From said shaft there extends an arm, C, which is firmly connected thereto by a set-screw or other suitable means. This arm forms the bearing for the fulcrum-pin $a$ of the dog D. This dog is of such a shape that its working face $b$ conforms to the inner circumference of the rim of the pulley, and stands in close proximity thereto, and its tail $c$ is provided with an adjusting-screw, $d$, which extends toward the periphery of the shaft.

E is a sliding sleeve which encircles the shaft B, and which is grooved at one end, as shown at $n$, Fig. 2, to receive an ordinary stop-lever, while its other end is chamfered off or tapering, so that the same will enter between this screw $d$ and the shaft B, and, by forcing said screw off from the shaft, the working face of the dog is pressed tightly against the inner circumference of the rim of the pulley, and said pulley is rendered rigid upon its shaft. By sliding the sleeve E outward, its pressure on the tail of the dog is relieved and the pulley is released.

A spring, $e$, which is connected to the arm C, and bears on a pin secured in the tail of the dog, keeps said dog in such a position that the sleeve can always be introduced between the screw $d$ and the shaft. By adjusting the screw $d$, the pressure exerted by the dog on the rim of the pulley can be regulated.

By these means a clutch-pulley is obtained which is cheap, easily operated, and not liable to get out of order.

I am aware of friction-clutch pulleys where dogs are caused to bear upon the rim of the pulley; but in all of these cases it is necessary that the pulley be constructed especially for the adaptation of the clutch mechanism. For instance, in the pulley patented to S. H. Brown, April 26, 1864, a secondary rim is made upon the pulley—this materially increases the expense of the pulley; and in the pulley patented to L. H. Olmstead, September 27, 1864, there is also a secondary rim formed upon the pulley.

I wish it to be observed that my invention can be applied to any ordinary pulley without in any degree changing the construction of the pulley. Hence it possesses many advantages over any other friction-clutch pulley known to me.

What I claim as my invention, and desire to secure by Letters Patent, is—

The arm C and dog D, pivoted thereto parallel with the pulley A, operating in combination with the sliding sleeve E, substantially as described, and for the purpose specified.

G. W. BISHOP.

Witnesses:
M. M. LIVINGSTON,
JOHN R. COOPER.